(No Model.) 2 Sheets—Sheet 2.

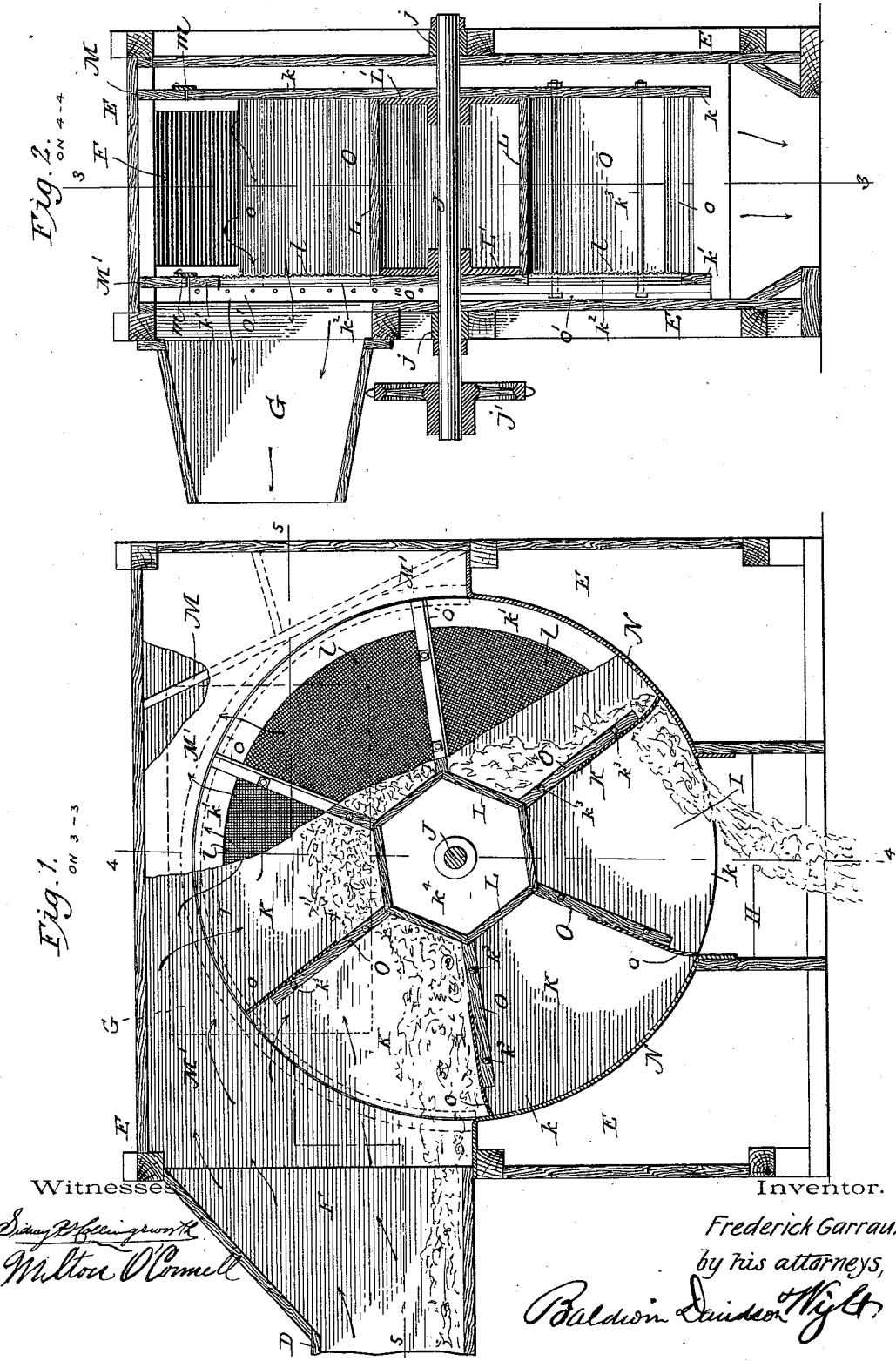

F. GARRAUX.
APPARATUS FOR ELEVATING SEED COTTON.

No. 521,159. Patented June 12, 1894.

Witnesses:
Sidney P. Hollingsworth
Milton O'Connell

Inventor.
Frederick Garraux
by his attorneys,
Baldwin Davidson & Wight

UNITED STATES PATENT OFFICE.

FREDERICK GARRAUX, OF ATLANTA, GEORGIA, ASSIGNOR TO THE WINSHIP MACHINE COMPANY, OF SAME PLACE.

APPARATUS FOR ELEVATING SEED-COTTON.

SPECIFICATION forming part of Letters Patent No. 521,159, dated June 12, 1894.

Application filed January 19, 1894. Serial No. 497,429. (No model.)

*To all whom it may concern:*

Be it known that I, FREDERICK GARRAUX, a citizen of the United States, residing at Atlanta, in the county of Fulton and State of Georgia, have invented certain new and useful Improvements in Apparatus for Elevating Seed-Cotton, of which the following is a specification.

My invention relates to that class of apparatus in which seed cotton is conveyed through a pneumatic tube or flue from a wagon or other source of supply to a separator where the cotton is separated from the air blast or current and is delivered to a distributer which feeds the gin or gin-feeders.

All modern separators are provided with a screen through which the air separated from the cotton passes and many of them are provided with a series of rotating buckets which receive the cotton from the air flue and deliver it, when separated from the air, to a discharge opening over the distributer. In all such apparatus prior to my invention the arrangement has been such that the cotton, after entering the separator, abuts directly upon the screen and then rebounds or falls therefrom into the buckets or into discharge passages or conveyers or else the screens are so arranged that the cotton is drawn directly against them by the air current and separated therefrom by gravity or by some moving part of the apparatus. In all such arrangements it has been found difficult to keep the screens clear, as by reason of the direct contact of the cotton with them and the force of the air blast, tufts or wads of cotton are drawn partially through the screen and lodged there, ultimately choking the entire screen and thus suspending the operation of the separator and as a consequence suspending the operation of the gins, condensers, presses and other apparatus usually employed in series with the separator.

The principal object of my invention is to prevent these difficulties by so constructing the apparatus that the cotton is separated from the air blast without coming into forcible contact with the screen and is carried by an improved conveyer to the discharge opening in the casing of the apparatus while the air entering and separated from the cotton passes through the screen out of the separator to the flue or passage that conveys it away.

The accompanying drawings show an apparatus constructed and organized in the way now best known to me for embodying my invention.

Figure 3:
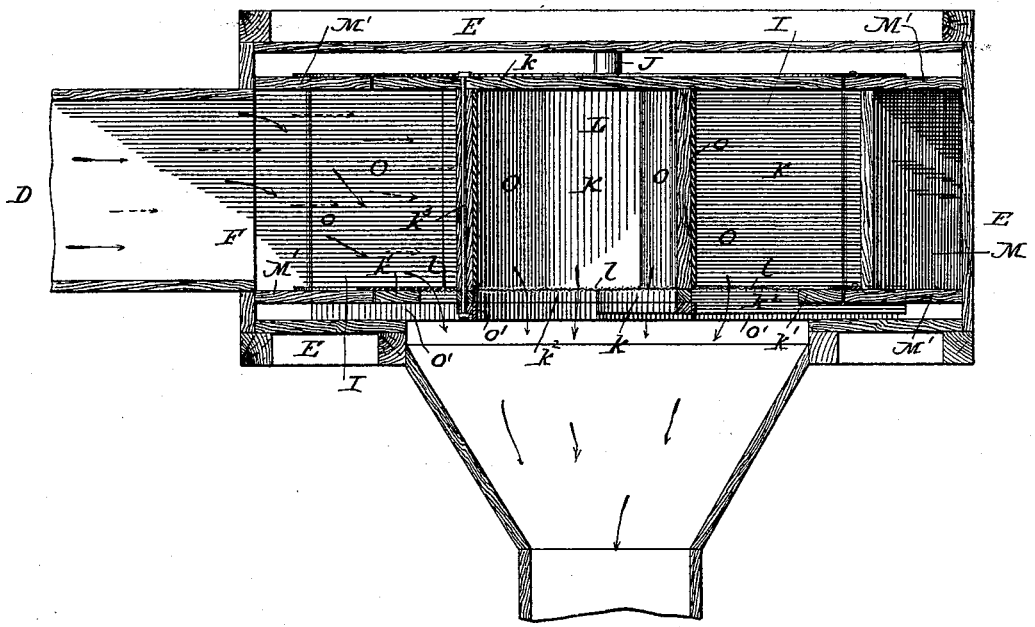
Figure 4:
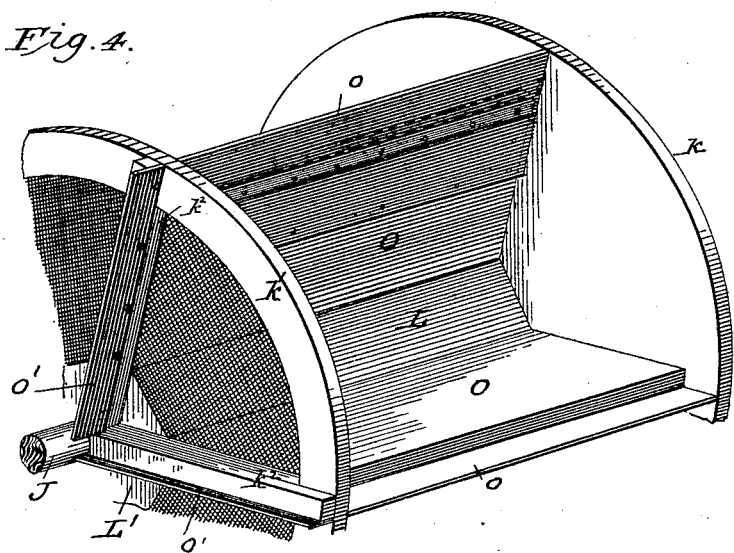

Figure 1 is an interior view mainly in section on the line 3—3 of Fig. 2, of the separator looking toward the air discharge opening. Fig. 2 is a vertical, central section on the line 4—4 of Fig. 1. Fig. 3 is a horizontal section on the line 5—5 of Fig. 1, and Fig. 4 is a perspective view of one of the buckets.

In general outline it consists of a casing E, having an entrance port F, an air discharge port G, a cotton discharge port H and a cotton conveyer I. The casing is preferably rectangular, and closed on all sides, except at the ports above mentioned by making the casing rectangular the machine may be made "right and left" or reversible. A shaft J extends centrally through the casing and turns in bearings $j$ therein, power being applied to operate the shaft by suitable gearing connected to the gear wheel or sprocket pulley $j'$. The shaft carries a series of radially arranged buckets K constituting a conveyer which buckets receive the cotton at the entrance port F and convey it to the cotton discharge port H. These buckets are formed as follows: A circular disk $k$ is secured to the shaft near one end and a ring $k'$ is mounted on radial spokes $k^2$ secured to the shaft near its opposite end. The disk and the spokes are bound together by bolts $k^3$ and a polygonal hub $k^4$ interposed between the disk and the spokes holds them a suitable distance apart and bears the strain of the bolts at the center of the conveyer. The specific construction of the hub is not material, as shown, however, it consists of six wooden plates or slabs L arranged around two end castings L'. Wire gauze $l$ is secured to the hub and to the ring $k'$ and forms a screen on the side of the conveyer through which the air passes to the discharge port G. At the back of the casing opposite the entrance port I arrange a board M extending from the top of the casing over one end of the air discharge port G to the back of the casing in line with the shaft J. From this board M other boards or partitions M' extend on opposite sides of the conveyer to the front of the casing being secured thereto air tight on opposite sides of the entrance port. These partitions M' are shaped on their under edges to correspond with the circular periphery of the conveyer and are armed with strips of leather m or similar packing which bear against the sides of the disk k and the ring k' affording an air tight joint. Below the conveyer and on each side of the discharge port H are shields N extending from one side of the casing to the other and formed to correspond with the circular shape of the conveyer which revolves in close proximity thereto. At their upper ends the shields are so formed and connected to the casing as to cut off communication for air between the upper and the lower portions thereof around the conveyer. Plates or wings O extending radially from the hub—and secured to the spokes—form with the disk, the screen and the hub—the buckets for conveying the cotton from the entrance to the discharge port. These plates are armed on their outer edges with strips of flexible material o which bear on the shields as the buckets revolve and form air tight joints therewith. Strips o' of flexible material secured to the spokes are arranged to bear upon the discharge side of the casing and prevent the flow of air along this side of the apparatus directly from the entrance to the discharge port. It will thus be observed that the conveyer or series of buckets is so incased and packed that air cannot flow past its sides to the air discharge port G or to the cotton discharge port H but must take the course provided for it and which is indicated by the feathered arrows up over the conveyer, down into the buckets and out through the screen to the discharge port G. The flue D where it connects with the entrance port F is approximately of the same width as that of the buckets and it is slightly enlarged at this point by an upwardly inclined board d which permits the air to separate from the column of cotton and move toward the discharge port G. It is perhaps not generally understood but such is the fact that the cotton in the flue does not fill it but moves along the bottom thereof in a comparatively shallow column while the air flows along with it in the upper part of the flue. I take advantage of this fact by so arranging the apparatus that the air as soon as it enters is conducted away from the cotton while the cotton separate from the air blast passes into the buckets as they revolve past the entrance ports. Each time that a bucket passes it severs from the column a small quantity of cotton which enters and falls into the buckets in the manner indicated in the drawings and occupies a position at the bottom of the bucket when opposite the air discharge port. As the buckets move toward the discharge port H the cotton moves out toward the outer ends of the buckets and finally falls from them. As indicated by the arrows the air passes over the cotton in the buckets and not through it. It presses downwardly on the cotton and tends to hold it in the buckets rather than draw it from them, the buckets being closed against any air draft which would tend to move the cotton from them, by which it results that the cotton is never drawn through or into the screen and there is no danger whatever of clogging or choking it. Any cotton which comes in contact with the screen in the lower part of the buckets or which remains in the buckets against the screen after passing the cotton discharge port H does not adhere to the screen as there is no suction to draw it into the meshes thereof but on the contrary the cotton readily separates itself from the screen and any fine tufts or particles which might adhere to it are separated by the incoming column of cotton, one side of which moves in contact with the screen as it enters. The bottom of the flue D is below the discharge port G and the buckets revolve in the direction indicated by the arrow, i. e., in the direction of the movement of the air current. As before stated the width of the flue D at the entrance port is preferably the same as that of the buckets but the exact width is not important, preferably, however, one side of the flue is in line with the screen side of the buckets so that the incoming column of cotton may wipe the screen in the manner above explained.

While I have shown a simple and efficient organization of instrumentalities for operating my invention, I do not limit myself to this one embodiment of my improvements, but

What I claim as my invention is—

1. The combination of a pneumatic tube or flue, a casing, a conveyer mounted therein and having air-tight joints with the casing, an entrance port, a cotton discharge port, and an air discharge port arranged transversely with reference to the entrance port and to one side thereof, and a screen carried by the conveyer arranged edgewise with reference to the entrance port and covering the air discharge port.

2. The combination of the casing, a rotary series of buckets mounted therein and having a screen on one side and a closed disk on the other side, a feed flue through which cotton is fed to the buckets between the sides thereof, and in contact with the screen, airtight packing separating the lower part of the casing below the entrance port from the upper part of the casing, packing for forming an air-tight joint between the buckets and the casing thereof below the axis of the conveyer and at the upper part of its periphery on both sides, an air discharge port in one side of the casing close to the screen forming one side of the buckets and a cotton discharge port in the lower part of the casing, the organization being such that the buckets successively take up charges of cotton as it enters the apparatus and delivers it to the cotton discharge port, while the air separates from the cotton at the entrance port and passes through the screen of the buckets on one side only thereof in proximity to the air discharge port of the casing.

In testimony whereof I have hereunto subscribed my name.

FREDERICK GARRAUX.

Witnesses:
LLOYD B. WIGHT,
C. M. BROOKE.